United States Patent [19]
Dufrane et al.

[11] 4,255,974
[45] Mar. 17, 1981

[54] ADHERENT CRACK GAUGE

[75] Inventors: Keith F. Dufrane, Columbus; David K. Snediker, Worthington, both of Ohio

[73] Assignee: Battelle Development Corporation, Columbus, Ohio

[21] Appl. No.: 48,550

[22] Filed: Jun. 14, 1979

[51] Int. Cl.³ .............................................. G01B 21/00
[52] U.S. Cl. ......................................... 73/776; 73/799
[58] Field of Search ........................... 73/776, 799, 775

[56] References Cited
U.S. PATENT DOCUMENTS

| 2,986,928 | 6/1961 | White | 73/776 |
| 3,596,269 | 7/1971 | Laska | 73/799 |
| 3,786,679 | 1/1974 | Crites | 73/775 |
| 3,803,485 | 4/1974 | Crites et al. | 73/799 |
| 3,948,089 | 4/1976 | Shaw et al. | 73/776 |

Primary Examiner—Anthony V. Ciarlante
Attorney, Agent, or Firm—Barry S. Bissell

[57] ABSTRACT

A crack gauge for monitoring the progress of fatigue crack propagation in a conductive substrate is made by applying an inorganic insulating layer and then a metallic conductor. The conductor is laid in a geometry which results in a change in a measured electrical property of the conductor (e.g., resistance) as a fatigue crack propagates through the substrate and breaks the conductor. The adherent crack gauge is especially reliable in hostile environments. A special conductor geometry is useful for especially fatigue resistant substrates.

10 Claims, 3 Drawing Figures

ADHERENT CRACK GAUGE

BACKGROUND OF THE INVENTION

The invention relates to the field of crack detection and especially to fatigue cracking in conductive materials, such as metals. Decal type crack detectors exist which are applied to fatigue crack substrates with an organic binder.

These decal detectors, however, often fail to fracture as a crack propagates or the conductors continue to make intermittent contact after fracture occurs. Both situations result in erroneous data. Moreover, the organic bond is not always stable in hostile environments, such as pressurized liquid or elevated temperatures.

The present invention overcomes these deficiencies of the decal type detectors by providing an inorganically bonded conductor. The geometry can be similar to those of the prior art decal type or a special geometry can be utilized.

SUMMARY OF THE INVENTION

It is an object of the invention to provide an integral, adherent crack gauge for reliably monitoring crack propagation in conductive substrates.

It is further an object to provide a method of reliably monitoring crack propagation using the novel crack gauge.

It is also an object to provide a crack gauge which is suitable and reliable in use with hostile environments.

It is a further object to provide an integral crack gauge having a special geometry for use with especially fatigue resistant substrates or with substrates in which a crack rapidly propagates after initiation.

In accordance with the objectives, the invention is a method of crack detection in conductive substrates which is an improvement over the old method of securing a separate insulated conductive element to the substrate and monitoring the change in resistance of the conductive element as a crack propagates through the substrate and severs the conductive element, wherein the improvement comprises crystallizing an adherent inorganic material on the surface of the metal substrate to form an insulating layer thereon, and thereafter crystallizing an adherent conductive material on the insulating layer to form the conductive element. The geometry of the conductive element may be further refined using a photoetching step.

The crack gauge (consisting of the insulating layer and the conductive element) is preferably applied by the known methods of flame spraying, enameling, sputtering, evaporation, chemical vapor deposition or sintering. The insulating layer and the conductive element may be any convenient thickness but the former is preferably about 0.5–50 microns and the latter is preferably about 0.1–10 microns. More preferably, the total thickness of the two layers is about 1–5 microns.

The insulating inorganic material may be any convenient material with the necessary insulating properties and ability to be applied in the desired fashion. Materials with an elastic modulus of greater than $1 \times 10^{12}$ dynes/cm$^2$ are preferred, specifically silica, yttria or alumina.

The conductive material is chosen for the electrical properties of its thin films and can be a metal, an alloy, or a metal compound (e.g., tin oxide). Metals such as titanium, copper, aluminum, silver and gold and an alloy such as manganin are particularly desirable conductive materials.

The conductive layer may also be covered by a protective cover layer of an insulating material if desired.

The present invention further comprises the crack gauge used in practicing the above described invention comprising the crystalline inorganic layer and the crystalline conductive element. The geometry of the conductive element of such crack gauge may be any convenient shape across which a measurable electrical property change occurs when a part of the element is severed by a propagating crack in the sample. "Ladder" and "individual leg" designs have proved successful. Perhaps more successful in a sample which is especially fatigue resistant or in which a crack propagates rapidly after initiation is a conductive element design made up of at least two separately monitorable independent regions, one of which is closer to the crack initiation point, such that the crack may be detected first by the nearer of the independent regions. This is desirable in that during testing of a fatigue specimen, an alarm could be sounded or the testing machine may be automatically shut down when a crack is detected by the nearer of the independent regions. This would allow the operator to ignore the specimen until the crack was initiated and then to closely observe the crack propagation. Testing conditions could also be changed after crack initiation to increase or decrease the propagation rate or stress. For example, the operator could accelerate the testing of a particularly fatigue resistant specimen prior to initiation and then decrease the rate to a desired level after the crack has progressed through the nearer of the independent regions of the crack gauge.

DETAILED DESCRIPTION OF THE INVENTION

Figure 1:
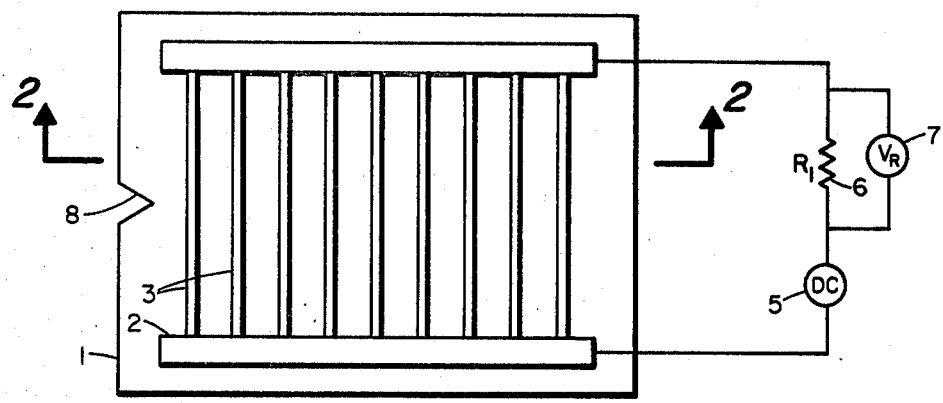
FIG. 1 is a schematic view of a crack gauge with a "ladder" geometry and the peripheral equipment for monitoring crack propagation in a conductive substrate.
Figure 2:
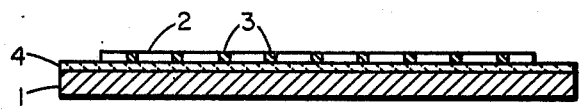
FIG. 2 is a sectional view of the conductive substrate and the crack gauge of FIG. 1 along line 2—2.

FIG. 1 and FIG. 2 show the inventive crack gauge and apparatus for practicing the inventive method. In the Figures, a conductive specimen or substrate 1 is subject to cracking. To monitor such cracking, a crack gauge is applied to the substrate 1. The crack gauge comprises a thin insulating layer 4 of a crystalline inorganic material on the surface of the substrate and a thin conductive element 2,3 of a crystalline conductive material.

Electrical components 5, 6, 7 comprise the detector circuit for monitoring a change in resistance across the conductive element 2, 3. The conductive element shown is a "ladder" design formed of common leads 2 joined by a plurality of parallel legs 3. The electrical components shown comprise a current source 5, a resistor 6 and a voltmeter 7 across the resistor 6.

The operation of the crack detector may be described as follows. A crack 8 propagates through the substrate 1, cutting the legs 3 of the conductive element. Naturally, as legs of the conductive element are cut, the overall resistance of the conductive element increases stepwise and the voltage drop across resister 6 decreases stepwise and may be recorded by the voltmeter 7.

Of course, numerous other electrical methods measuring current, voltage drop, resistance and other properties could be used to detect the severance of individual legs of the conductive element. Other geometries may also be used for the conductive element as long as it results in a measurable change of an electrical property in response to propagation of a crack in the substrate. A second geometry which could be used is a design with individual legs, each having separate leads to the ends thereof. A break in each leg would then easily be recognized by an open circuit between the respective leads.

Figure 3:
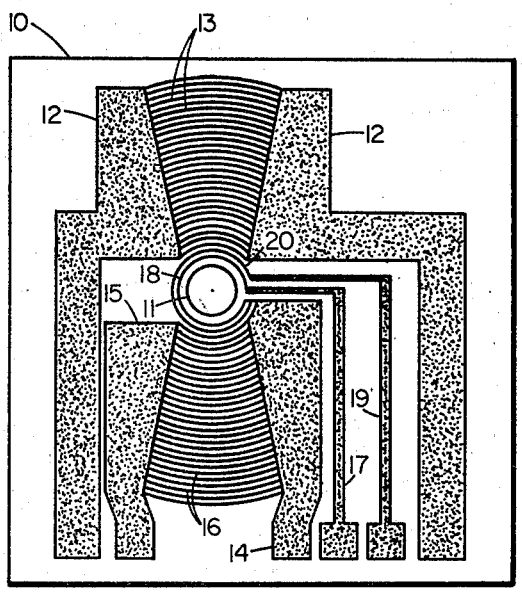
FIG. 3 is one design for the conductive element employing three independently monitorable regions on each side of a central hole for detecting the crack initiation and propagation from the hole.

A variation on the ladder design of FIG. 1, using common leads, is shown in FIG. 3. This design is useful for detecting cracking from a central hole 11 in a substrate 10. One gauge encircling the hole could be used, however, if the direction of cracking is important or if the independent observation of multiple cracks is expected then two gauges may be used as shown in FIG. 3. The Figure also shows a useful design for especially fatigue resistant substrates or with substrates in which cracks may propagate rapidly after initiation. Two conductive elements are shown, one comprising common leads 12 joined by a plurality of legs 13 and the other comprising common leads 14 and 15 joined by a plurality of legs 16. In addition, two separately monitorable portions of each conductive element comprising common leads 14 and 17 joined by leg 18 and common leads 14 and 19 joined by leg 20 are shown which may be used as an early warning system. As a crack propagates from the hole 11, the leg 18, being nearest the hole, is first severed causing an open circuit in electrical equipment monitoring leads 14 and 17. In the same manner, leg 20, being the next nearest the hole, would be subsequently severed by an advancing crack causing a measurable change in electrical equipment forming a circuit with leads 14 and 19. One or both of these separately monitorable portions of the conductive elements can be used as early warning detectors of crack initiation.

If the substrate is in a fatigue testing machine the early warning detectors can be monitored by external electrical equipment which sounds an alarm, shuts off the fatigue testing machine or changes its rate or load on the substrate when a crack is initiated and breaks the nearest leg 18.

There are several different ways to apply the inorganic insulating layer and the conductive element to the substrate. Known processes of flame spraying, enameling, sputtering, evaporation, chemical vapor deposition or sintering can be used successfully. A prior cleaning treatment of the substrate such as with acid bath or electrolytic cleaning, is preferred to improve adherence of the insulating film.

Some of the preferred methods of applying the insulating layer and the conductive element are as follows:

(1) Sputter the insulating layer, evaporate a continuous conductive layer thereon and photoetch the final geometry of the conductive element.

(2) Sputter the insulating layer, evaporate the conductive element thereon directly using a mask during evaporation. This gives less definition than photoetching.

(3) Screen print, dry and sinter a dispersion of an inorganic insulating material in a vehicle onto the substrate, and screen print, dry and sinter a conductive material in a vehicle onto the inorganic layer with the design of the conductive element.

(4) If the metal substrate can be oxidized (e.g., aluminum), then oxidize the surface to yield the insulating layer and evaporate or screen print and sinter the conductive element directly on the oxide layer.

Example of the Preferred Embodiment

A 6061-T6 aluminum sheet fatigue specimen is provided with a crack detection system in the following manner.

To insure a smooth, clean surface for adequate bonding and accurate detector response to fracture, the aluminum specimen is sanded with 600 grit paper using a flood of water followed by steel wool (000) finishing until a surface of about 0.05 microns (center-line average) is obtained. The specimen is washed with detergent in water, blown dry and wiped with alcohol. Final cleaning is done with 5 minute immersions in toluene, then acetone and methanol and a one hour oven dry at 85°–100° C.

Cleaned specimens are placed in a vacuum chamber prepared for both RF sputtering and vaporization. Both processes are completed without breaking the vacuum to prevent contamination.

The vacuum chamber is initially pumped to $10^{-7}$ torr and backfilled with argon which is maintained during sputtering at $6\times10^{-3}$ torr. An alumina layer is then sputtered to a thickness of 1.5–2.0 microns, requiring about 8–10 hours. Thickness is visually determined from observation of interference light bands.

Following sputtering of the insulating layer, the pressure is again reduced to $10^{-7}$ torr and a conductive manganin alloy is vaporized and deposited on the alumina layer. Vaporization is provided by feeding manganin wire onto a heated tungsten filament causing the alloy to melt and temporarily form a liquid droplet. The droplet then vaporizes and coats the specimen by simple line of sight impingement. A manganin coating of about 1.0 micron is achieved with twenty drops of manganin on the tungsten filament.

The specimen is allowed to cool and is removed from the vacuum chamber. In order to develop the gauge conductor, the specimen is submerged in AZ 1350B positive type photo resist solution and removed at a controlled rate of about 1.25 cm/min. to insure a uniform coating. The specimen is then air dried and baked in at 85°–100° C. oven for 20 minutes.

A photographic transparency of the desired conductor configuration (such as shown in the Figures.) is placed tightly over the coated specimen and exposed to arc light. The exposed specimen is then dipped into Type AZ developer for 2 minutes using a 1 to 5 solution of developer to water. After water washing, the pattern is clearly visible.

The undesired portion of the manganin layer (the negative of the conductor geometry) is then etched away in a 1 to 50 solution of ferric chloride and distilled water. The photo resist covering the conductor geometry is then removed with Type AZ photo resist thinner to complete the production of the gauge.

After completion of the gauge, electrical leads are installed by using epoxy for mechanical attachment of the wires to the specimen and silver conductive paint for electrical connection to the conductor pads.

We Claim:

1. An improved method for crack detection in conductive substrates by the old method of securing a separate, insulated conductive element to the substrate surface and monitoring the change in an electrical property of the conductive element as a crack propagates through the substrate and severs the conductive element wherein the improvement comprises crystallizing an adherent inorganic material on the surface of said conductive substrate to form an insulating layer, and thereafter, crystallizing an adherent conductive material on the insulating layer to form the conductive element.

2. The crack detection method of claim 1 wherein the inorganic material is applied by flame spraying, enameling, sputtering, evaporation, chemical vapor deposition or sintering.

3. The crack detection method of claim 2 wherein the thickness of the insulating layer is about 0.5-50 microns.

4. The crack detection method of claim 1 or 2 wherein the inorganic material comprises alumina, yttria or silica.

5. The crack detection method of claim 1 wherein the conductive material is applied by flame spraying, enameling, sputtering, evaporation, chemical vapor deposition or sintering.

6. The crack detection method of claim 5 wherein the thickness of the conductive element is about 0.1-10 microns.

7. The crack detection method of claim 5 wherein the conductive material is a metal or metal alloy.

8. The crack detection method of claim 7 wherein the metal conductive material is titanium, copper, aluminum, silver or gold.

9. The crack detection method of claim 1 wherein the conductive element is further formed by photoetching.

10. The crack detection method of claim 1, 2, or 5 wherein the conductive element is formed into at least two separately monitorable, independent regions such that a propagating crack will be detected by a first such region nearer a crack initiation point prior to detection by a second such region farther from said crack initiation point.

* * * * *